United States Patent
Terasaka et al.

(10) Patent No.: US 12,269,173 B2
(45) Date of Patent: Apr. 8, 2025

(54) ROBOT SYSTEM

(71) Applicant: FANUC CORPORATION, Yamanashi (JP)

(72) Inventors: Junya Terasaka, Yamanashi (JP); Masao Motohashi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 244 days.

(21) Appl. No.: 17/921,703

(22) PCT Filed: May 20, 2021

(86) PCT No.: PCT/JP2021/019191
§ 371 (c)(1),
(2) Date: Oct. 27, 2022

(87) PCT Pub. No.: WO2021/241397
PCT Pub. Date: Dec. 2, 2021

(65) Prior Publication Data
US 2023/0166402 A1 Jun. 1, 2023

(30) Foreign Application Priority Data
May 25, 2020 (JP) ................... 2020-090261

(51) Int. Cl.
*B25J 9/16* (2006.01)

(52) U.S. Cl.
CPC .......... *B25J 9/1682* (2013.01); *B25J 9/1669* (2013.01); *B25J 9/1674* (2013.01); *G05B 2219/39121* (2013.01)

(58) Field of Classification Search
CPC ...... B25J 9/1682; B25J 9/1669; B25J 9/1674; G05B 2219/39121
See application file for complete search history.

(56) References Cited

U.S. PATENT DOCUMENTS 5,371,836 A * 12/1994 Mitomi ................ G05B 19/425
  901/31
8,195,368 B1 * 6/2012 Leban ..................... B63B 27/10
  212/277

(Continued)

FOREIGN PATENT DOCUMENTS

EP 1693165 A2 8/2006
JP H0584678 A 4/1993

(Continued)

OTHER PUBLICATIONS

International Search Report issued on Jul. 13, 2021, in connection with corresponding International Patent Application No. PCT/JP2021/019191; 5 pages.

*Primary Examiner* — Sze-Hon Kong
(74) *Attorney, Agent, or Firm* — Maier & Maier, PLLC

(57) ABSTRACT

A robot system including a plurality of robots, controllers that respectively control the robots, hands attached to wrist ends of the robots and configured to hold and release a workpiece, and a sensor configured to detect that the workpiece is being held by the hands of the robots. The controllers are interconnected and configured to exchange signals so that the robots operate in coordination in response to an operation command that includes a coordination command, and prohibit operation of each of the robots based on an operation command that lacks a coordination command in a state in which the sensor detects the workpiece being held.

3 Claims, 6 Drawing Sheets

(56) References Cited

U.S. PATENT DOCUMENTS

| | | | | |
|---|---|---|---|---|
| 9,315,367 | B2* | 4/2016 | Ooga | B66F 9/07577 |
| 10,646,993 | B1* | 5/2020 | Wiley | B25J 9/16 |
| 2004/0199290 | A1* | 10/2004 | Stoddard | B25J 9/1682 |
| | | | | 700/248 |
| 2005/0055132 | A1* | 3/2005 | Matsumoto | B25J 9/1682 |
| | | | | 700/245 |
| 2005/0065654 | A1* | 3/2005 | Hariki | B25J 9/1612 |
| | | | | 700/245 |
| 2006/0145647 | A1* | 7/2006 | Kitatsuji | G05B 19/414 |
| | | | | 318/568.11 |
| 2009/0012647 | A1* | 1/2009 | Kamiya | B25J 9/1669 |
| | | | | 700/262 |
| 2012/0253507 | A1* | 10/2012 | Eldershaw | G06Q 10/08 |
| | | | | 901/14 |
| 2014/0156068 | A1* | 6/2014 | Graca | B25J 9/1682 |
| | | | | 700/255 |
| 2017/0014995 | A1* | 1/2017 | Kato | B25J 9/1633 |
| 2017/0182666 | A1* | 6/2017 | Szarski | B25J 13/089 |
| 2018/0021944 | A1* | 1/2018 | Schreiber | B25J 9/1682 |
| | | | | 700/248 |
| 2019/0016543 | A1* | 1/2019 | Turpin | B25J 9/1697 |
| 2019/0210217 | A1* | 7/2019 | Jetté | B25J 9/0069 |
| 2019/0358817 | A1* | 11/2019 | Ghazaei Ardakani | |
| | | | | B25J 9/1689 |
| 2020/0171650 | A1* | 6/2020 | Hallock | B25J 9/009 |
| 2020/0376663 | A1* | 12/2020 | Voelz | B25J 9/1664 |
| 2022/0258336 | A1* | 8/2022 | Okawa | B25J 9/1664 |
| 2022/0284599 | A1* | 9/2022 | Yasuda | G06T 3/40 |
| 2023/0166403 | A1* | 6/2023 | Gao | B25J 9/1682 |
| | | | | 700/248 |

FOREIGN PATENT DOCUMENTS

| | | |
|---|---|---|
| JP | 2554968 B2 | 11/1996 |
| JP | 2003-159683 A | 6/2003 |
| JP | 2006-187826 A | 7/2006 |
| JP | 5563493 B | 7/2014 |
| JP | 2016-117142 A | 6/2016 |
| JP | 2017-013214 A | 1/2017 |
| WO | 2016103298 A1 | 6/2016 |

* cited by examiner

ROBOT SYSTEM

TECHNICAL FIELD

The present disclosure relates to a robot system.

BACKGROUND

There is a known method for transferring one article by using two robots (for example, see Japanese Patent No. 2554968).

This transferring method involves inputting article information and transfer destination information, setting a transfer route, maintaining the distance between the robots to be within a particular range, downloading an operation speed calculated from an operation distance of each robot, and starting synchronized operation of the robots such that the two robots reach a target point simultaneously.

SUMMARY

An aspect of the present disclosure is a robot system that includes a plurality of robots; controllers that respectively control the robots; hands attached to wrist ends of the robots and configured to hold and release a workpiece; and a sensor configured to detect that the workpiece is being held by the hands of the robots, wherein the controllers are interconnected and configured to exchange signals so that the robots operate in coordination in response to an operation command that includes a coordination command, and prohibit operation of each of the robots based on an operation command that lacks a coordination command in a state in which the sensor detects the workpiece being held.

DETAILED DESCRIPTION OF THE EMBODIMENTS

In transferring one article by using two robots, whether or not the two robots are actually in a synchronized operation state is determined solely through check work of an operator who is manipulating or teaching the robots. Thus, if the operator makes an error in check work or setting, the two robots would operate out-of-synchronization, and this may lead to breaking of the article, the hand holding the article, or the robot itself, dropping of the article, etc.

Thus, there is a demand for a robot system that can prevent breaking of the article, the hand, and the robot itself, dropping of the article, etc., even when the operator makes errors in check work or settings.

An aspect of the present disclosure is a robot system that includes a plurality of robots; controllers that respectively control the robots; hands attached to wrist ends of the robots and configured to hold and release a workpiece; and a sensor configured to detect that the workpiece is being held by the hands of the robots, wherein the controllers are interconnected and configured to exchange signals so that the robots operate in coordination in response to an operation command that includes a coordination command, and prohibit operation of each of the robots based on an operation command that lacks a coordination command in a state in which the sensor detects the workpiece being held.

A robot system 1 according to an embodiment of the present disclosure will now be described with reference to the drawings.

Figure 1:
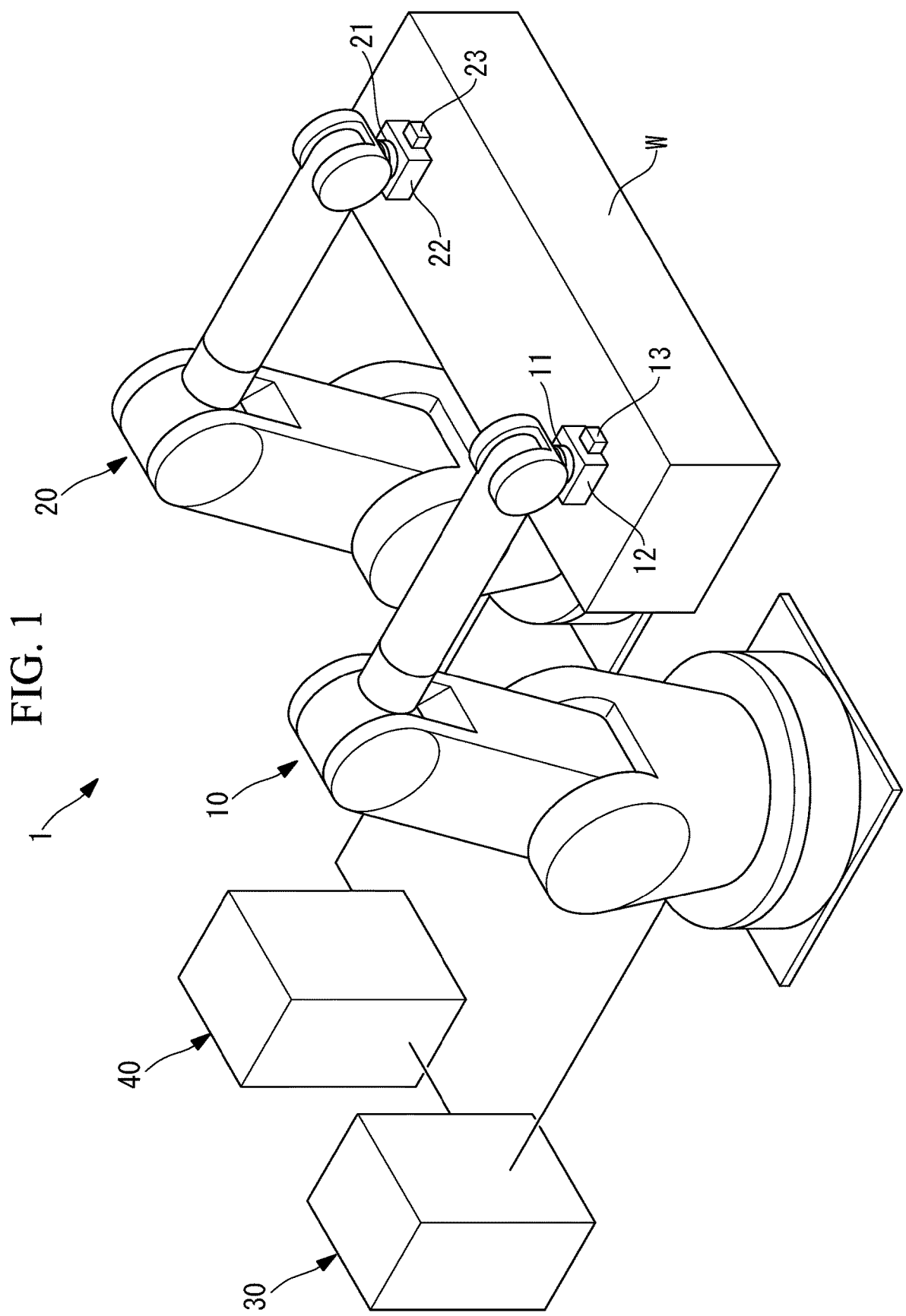
FIG. 1 is a perspective view of a robot system according to an embodiment of the present disclosure.
Figure 2:
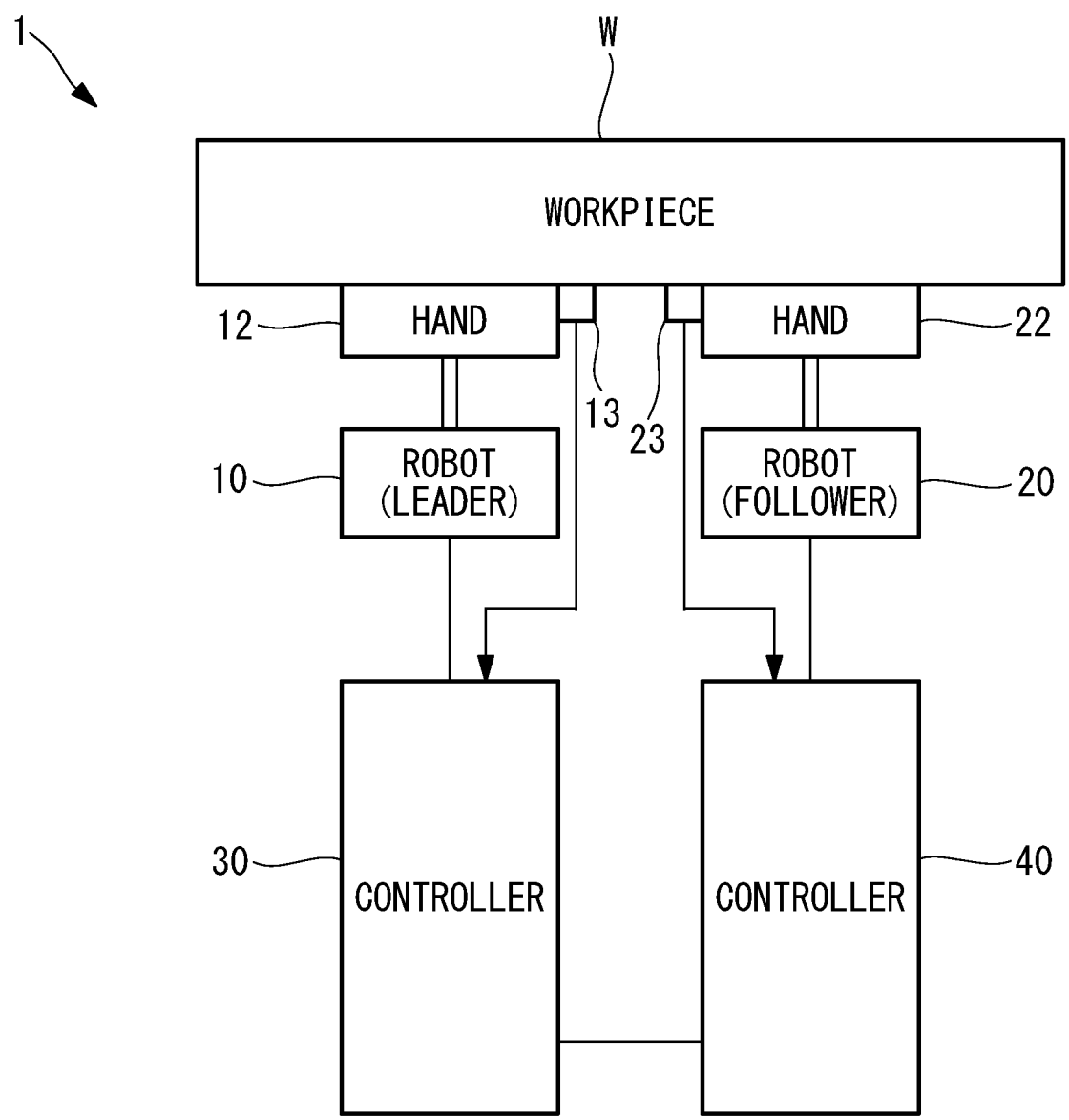
FIG. 2 is a block diagram illustrating the robot system illustrated in FIG. 1.

As illustrated in FIGS. 1 and 2, the robot system 1 according to this embodiment is equipped with two six-axis articulated robots 10 and 20, and controllers 30 and 40 that can independently control the robots 10 and 20, respectively. The robot 10 has a wrist end 11 and a hand 12 attached to the wrist end 11, the robot 20 has a wrist end 21 and a hand 22 attached to the wrist end 21, and the hands 12 and 22 can hold and release a workpiece W. Sensors 13 and 23 are respectively attached to the hands 12 and 22 so as to detect that a workpiece W is being held by the respective hands 12 and 22.

The hands 12 and 22 may be of any type. For example, the workpiece W may be held by two or more fingers, or the workpiece W may be held by suction by a magnetic force or pressure. The type of the hand 12 of the robot 10 and the type of the hand 22 of the robot 20 may be the same or different.

The sensors 13 and 23 may also be of any type. For example, proximity sensors that detect the workpiece W when the workpiece W is held by the hands 12 and 22 may be used, or actuators installed in the hands 12 and 22 may detect holding of the workpiece W based on a change in force. The type of the sensor 13 of the robot 10 and the type of the sensor 23 of the robot 20 may be the same or different.

The two controllers 30 and 40 that respectively control the two robots 10 and 20 are interconnected and exchange signals. When an operation command that includes a coordination command is outputted from a teach pendant connected to the controller 30 (leader-side controller) or an operation program executed in the leader-side controller 30, the two controllers 30 and 40 control the two robots 10 and 20 to operate in coordination.

In other words, when a coordination command is included in an operation command, the follower-side controller 40 controls the follower robot 20 by using, as a reference, coordinate axes xyz fixed with respect to the hand 12 of the leader robot 10 controlled by the leader-side controller 30.

Figure 3:
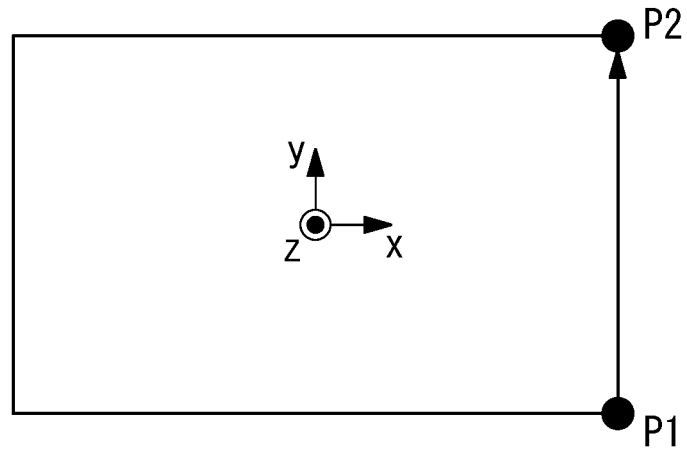
FIG. 3 is a diagram illustrating an operation based on a coordination command when one robot moves linearly between two points on a workpiece held by another robot.
Figure 4:
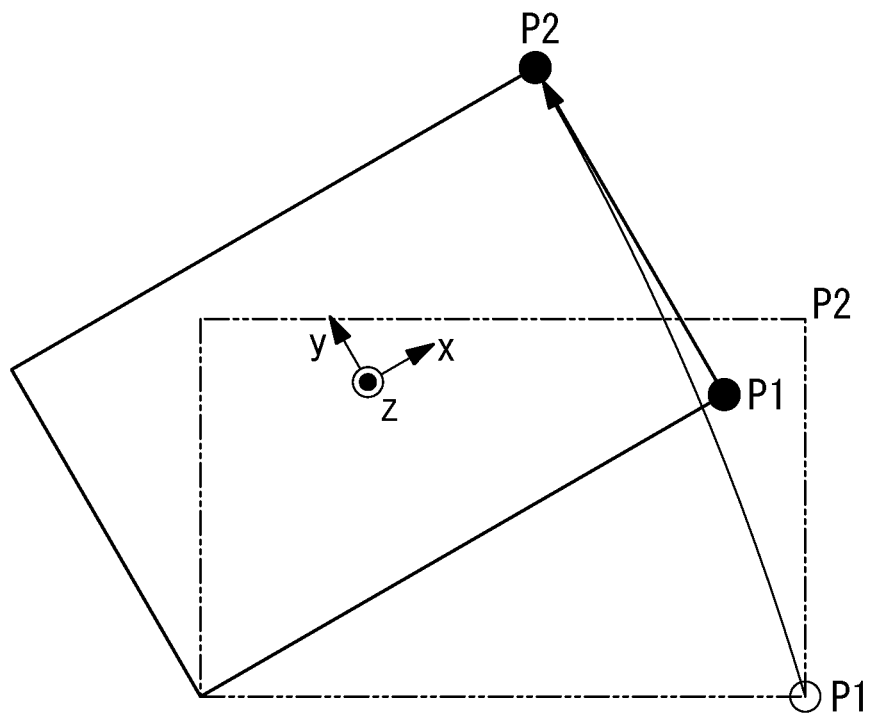
FIG. 4 is a diagram illustrating an operation of the one robot as the other robot moves the workpiece in FIG. 3.

For example, as illustrated in FIG. 3, a case in which an operation command of linearly moving the follower robot 20 between two points P1 and P2 on a workpiece W held by the hand 12 of the leader robot 10 is described as an example. As illustrated in FIG. 4, when a coordination command is included in an operation command, the follower robot 20 is controlled to move linearly between the two points P1 and P2 on the workpiece W irrespective of how the coordinate axes xyz fixed with respect to the hand 12 of the leader robot 10 are moved.

Figure 5:
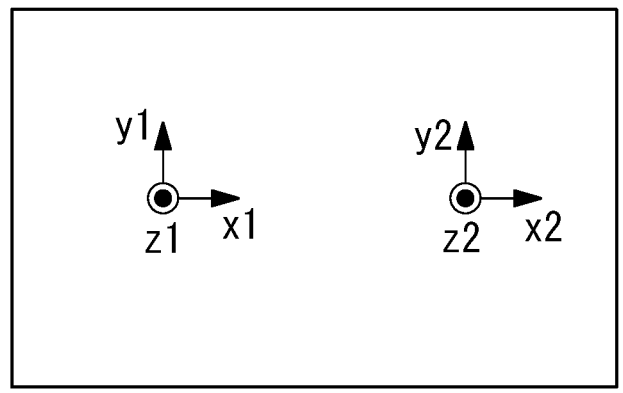
FIG. 5 is a diagram illustrating operation based on a coordination command in the robot system illustrated in FIG. 1.
Figure 6:
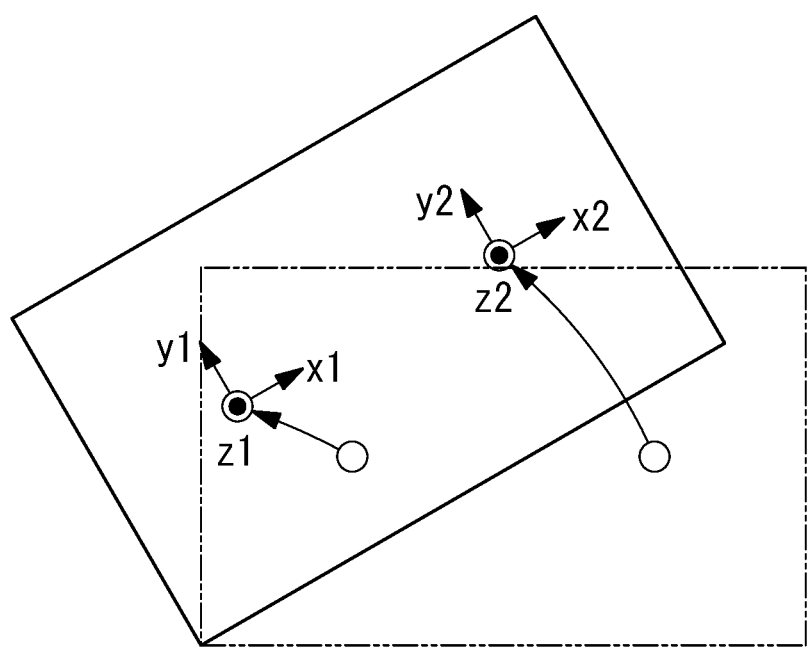
FIG. 6 is a diagram illustrating movement of the one robot as the other robot moves the workpiece in FIG. 5.

When one workpiece W is transferred by two coordinated robots 10 and 20, the operation command includes a coordination command, and the only teaching point for the follower robot 20 is the position and orientation of the workpiece W held by the hand 22. In such a case, as illustrated in FIGS. 5 and 6, the follower robot 20 is controlled so that, when viewed from coordinate axes x1, y1, z1 fixed with respect to the hand 12 of the leader robot 10, coordinate axes x2, y2, z2 fixed with respect to the hand 22 of the follower robot 20 always remain stationary.

In this manner, for example, as illustrated in FIG. 1, the robots 10 and 20 can simultaneously hold, by the hands 12 and 22, one heavy workpiece W that exceeds the payload of each of the robots 10 and 20 and transfer.

In other words, when the two robots 10 and 20 simultaneously hold a single workpiece W by using the hands 12 and 22, the relative movement between the workpiece W and the two hands 12 and 22 becomes fixed.

Thus, when the controller 30 outputs, to the robot 10 only, an operation command of changing orientation of the hand 12 and when this operation command includes a coordination command, the other robot 20 also operates in coordination, and thus the relative movement between the two hands 12 and 22 is prevented.

Figure 7:
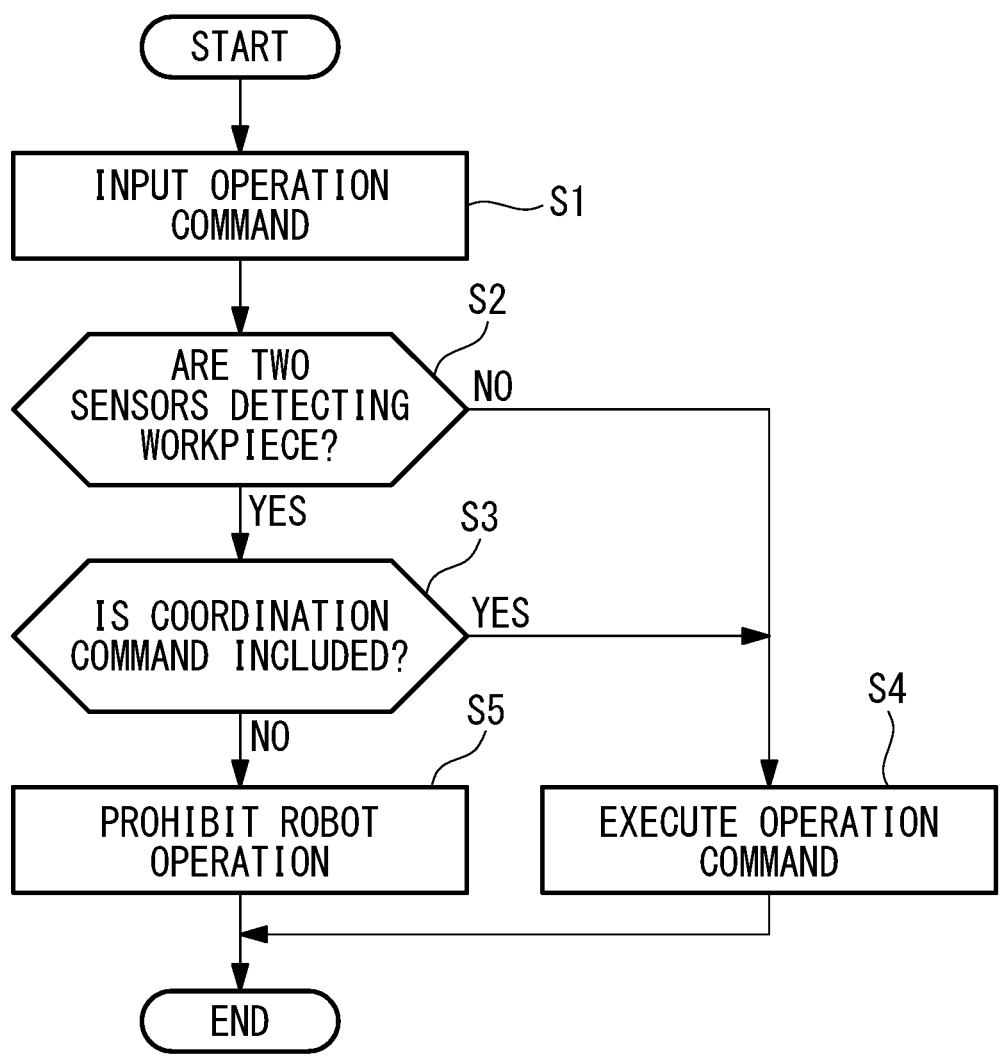
FIG. 7 is a flowchart illustrating how the robots are controlled in the robot system illustrated in FIG. 1.

Here, the controllers 30 and 40 respectively control the robots 10 and 20 as illustrated in FIG. 7. In other words, when an operation command is input to the leader robot 10 (step S1), detection signals from the sensors 13 and 23 installed in the two hands 12 and 22 are monitored. Then it is determined whether or not the two sensors 13 and 23 detect that the two hands 12 and 22 are holding the workpiece W (step S2). If the two sensors 13 and 23 detect that the two hands 12 and 22 are holding the workpiece W, it is determined whether the operation command includes a coordination command (step S3).

If the operation command includes a coordination command, the operation command is executed (step S4), and if the operation command lacks a coordination command, the operation of the robot 10 is prohibited (step S5). In addition, in the step S3, if it is detected that one of the two hands 12 and 22 is not holding the workpiece W, the operation command is executed (step S4).

If it is detected that the two hands 12 and 22 are together holding the workpiece W, it can be determined that the two robots 10 and 20 are trying to simultaneously hold and transfer the same workpiece W, and thus, in such a case, the operation command must include a coordination command.

However, due to errors in check work or setting by the operator, it is possible that an operation command from a teach pendant or an operation command from the program lacks a coordination command.

According to the robot system 1 of this embodiment, when such an incident occurs and when both sensors 13 and 23 are detecting holding of the workpiece W, the two controllers 30 and 40 stop operation of the two robots 10 and 20 unless a coordination command is included in the operation command.

This prevents the robot 10 from operating alone or prevents the robots 10 and 20 from operating without coordination while two hands 12 and 22 are holding the same workpiece W. This provides an advantage in that breaking of the workpiece W, the hands 12 and 22, and the robots 10 and 20 themselves, dropping of the workpiece W, etc., can be prevented.

Meanwhile, if at least one of the two sensors 13 and 23 does not detect the holding of the workpiece W, the robots 10 and 20 are operated according to the operation commands even when the operation commands lack a coordination command. In other words, the robots 10 and 20 are operated according to the operation commands not only when a coordination command is deliberately absent but also when a coordination command is absent due to errors in check work or setting made by the operator.

If the two hands 12 and 22 are not holding the same workpiece W simultaneously, the coordinated operation may not be intended, and thus the two robots 10 and 20 are separately operated according to the operation commands. In this manner, the operability and workability can be improved even when an operation command deliberately lacking a coordination command is used. Moreover, even when an operation command that lacks a coordination command is used due to errors in check work or setting made by the operator, inconvenience such as breaking or falling is avoided.

Figure 8:
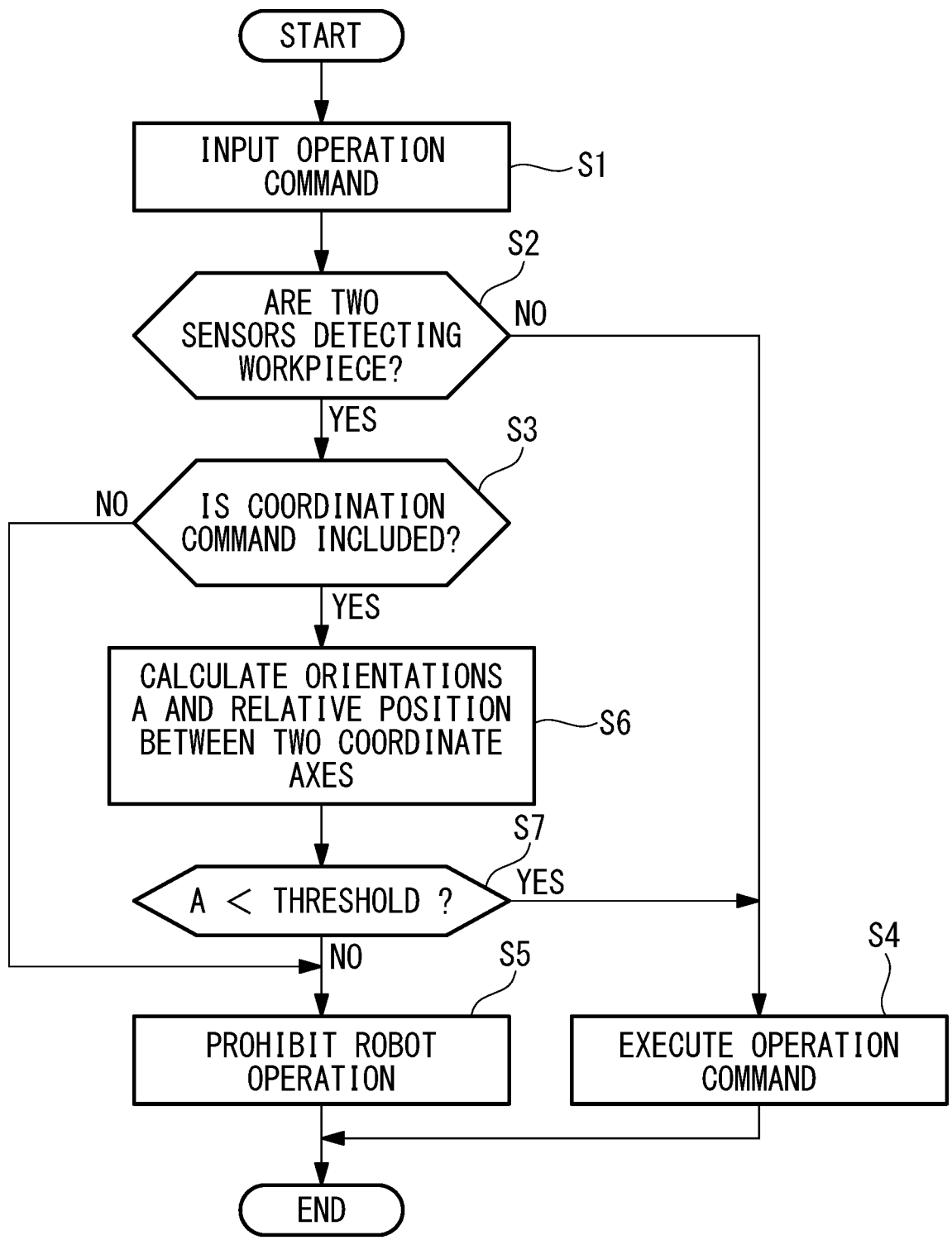
FIG. 8 is a block diagram illustrating a modified example of the robot system illustrated in FIG. 1.

In this embodiment, if both sensors 13 and 23 detect holding of the workpiece W, the operation of the robots 10 and 20 is prohibited unless the operation command includes a coordination command. In addition, as illustrated in FIG. 8, if both sensors 13 and 23 detect holding of the workpiece W and a coordination command is included, the relative position of the coordinate axes and orientations A fixed with respect to the hands 12 and 22 of the two robots 10 and 20 may be sequentially monitored (step S6).

Then it may be determined whether the relative position of the two coordinate axes and the orientations A have changed by a particular threshold or more (step S7), and, if the amount of change is equal to or more than the threshold, the robots 10 and 20 may be controlled to be prohibited from operating (step S5).

As mentioned above, in the case where one workpiece W is transferred by two coordinated robots 10 and 20, the operation command includes a coordination command, and there is only one teaching point for a state where the follower robot 20 holds the workpiece W with the hand 22.

In such a case, the follower robot 20 is controlled so that, when viewed from coordinate axes fixed with respect to the hand 12 of the leader robot 10, coordinate axes fixed with respect to the hand 22 of the follower robot 20 always remain stationary.

However, due to errors in check work or setting made by the operator, there may be instances where the number of the teaching points is more than one even when the operation command from the teach pendant or the operation command from the program includes a coordination command.

According to this embodiment, even in such a case, the controllers 30 and 40 stop operation of the robots 10 and 20 if both sensors 13 and 23 detect holding of the workpiece W and the relative position between the two coordinate axes and the orientations A change by an amount equal to or more than a particular threshold.

This prevents the robot 10 from operating alone or prevents the two robots 10 and 20 from changing the relative position between the two coordinate axes or the orientations A while two hands 12 and 22 are holding the same workpiece W. As a result, there is an advantage in that breaking of the workpiece W, the hands 12 and 22, and the robots 10 and 20 themselves, dropping of the workpiece W, etc., can be prevented.

This embodiment may further include a notifying device that issues a notification that the controllers 30 and 40 have prohibited operations of the robots 10 and 20 when the controllers 30 and 40 prohibit the operations.

If a coordination command is absent although both sensors 13 and 23 are detecting holding of the workpiece W, the notifying device may issue a notification for notifying the situation, or if the relative position between the two coordinate axes or the orientations A change, the notifying device may issue a notification for notifying the situation.

When the robots 10 and 20 stop operation due to errors in check work or setting made by the operator, it is often the case that the operator is unaware of the cause thereof; thus, such notifications provide an advantage in that the operator can more clearly learn the cause behind the robots 10 and 20 stopping operation.

The notifications may be made by displaying the notifications on a monitor or by sound.

The invention claimed is:

1. A robot system comprising:
   a plurality of robots;
   a plurality of controllers that respectively control the robots;
   hands attached to wrist ends of the robots and configured to hold a workpiece; and
   a sensor configured to detect that the workpiece is being held by the hands of the robots,
   wherein the plurality of controllers are configured to:
     control the robots to operate in coordination in response to an operation command that includes a coordination command;
     prohibit operation of each of the robots based on an operation command that lacks a coordination command when the sensor detects that the workpiece is being co-held by the robot; and
     control the robots to operate in response to the operation command that lacks the coordination command and based on detection result of the sensor, wherein the detection result indicates that the robots are not co-holding the workpiece.

2. The robot system according to claim 1, further comprising a notifying device configured to notify that the plurality of controllers have prohibited the operations of the robots when the plurality of controllers prohibit the operations of the robots.

3. A robot system comprising:
   a plurality of robots;
   a plurality of controllers that respectively control the robots;
   hands attached to wrist ends of the robots and configured to hold a workpiece; and
   a sensor configured to detect that the workpiece is being held by the hands of the robots,
   wherein the plurality of controllers are interconnected and configured to exchange signals so that the robots operate in coordination in response to an operation command that includes a coordination command, and prohibit operation of each of the robots based on an operation command that lacks a coordination command in a state in which the sensor detects that the workpiece is being co-held by the robot, and
   wherein, when the sensor detects the workpiece being held and when the operation command including the coordination command is used, the plurality of controllers sequentially monitor a relative position between a coordinate axis fixed with respect to the hand of one of the robots and a coordinate axis fixed with respect to the hand of another one of the robots and the plurality of controllers sequentially monitor orientations of the one hand and the other hand, and prohibit operation of the robots if the orientations and the relative position between the two coordinate axes change by an amount equal to or more than a particular threshold.

\* \* \* \* \*